Dec. 10, 1940.  H. RICHTER  2,224,486
MANUFACTURE OF GLASS AMPOULES
Filed Sept. 14, 1937  2 Sheets-Sheet 1

Inventor
HARRY RICHTER
By Charles B. Belknap
Attorney

Dec. 10, 1940.  H. RICHTER  2,224,486
MANUFACTURE OF GLASS AMPOULES
Filed Sept. 14, 1937  2 Sheets-Sheet 2
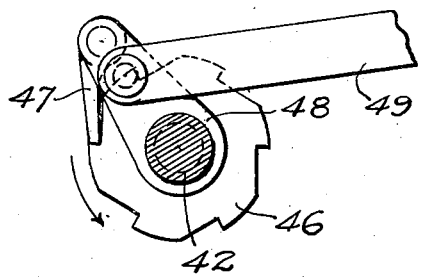
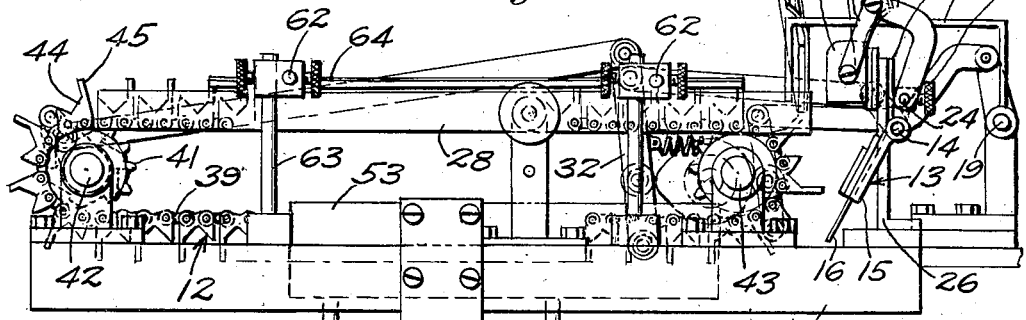
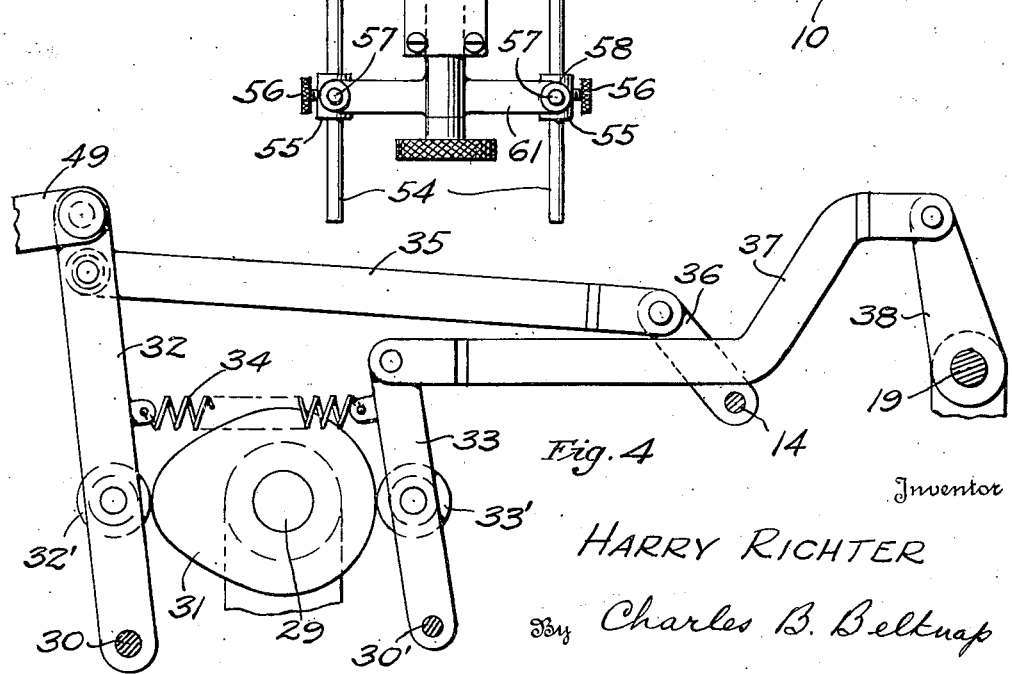
Inventor
HARRY RICHTER
By Charles B. Belknap
Attorney Patented Dec. 10, 1940

2,224,486

UNITED STATES PATENT OFFICE 2,224,486

MANUFACTURE OF GLASS AMPOULES

Harry Richter, Vineland, N. J., assignor to Kimble Glass Company, Vineland, N. J., a corporation of Illinois Application September 14, 1937, Serial No. 163,863

1 Claim. (Cl. 49—28)

This invention relates to the manufacture of glass ampoules, and more particularly to a method and apparatus for relieving sub-normal pressure in sealed ampoules.

In the manufacture of ampoules on machines of the type illustrated in the patent to Dichter, No. 1,962,985, dated June 12, 1934, the ampoules, after being shaped, are closed at their ends. Since the air within the ampoules is rarefied during the several heating operations, immediately preceding the sealing of the ends there is a partial vacuum created therein when the ampoules have cooled. Subsequently the neck of the ampoule is scored and broken. While the fracture is relatively clean when the neck is broken, there is a possibility that minute particles of glass or foreign material may be drawn into the ampoule were air at atmospheric pressure permitted suddenly to enter the ampoule. It is, therefore, one of the objects of the invention to prevent the inrush of air when the neck is fractured by puncturing or otherwise providing an opening in the neck above the fracture line prior to fracturing the neck thereby relieving the partial vacuum.

It is a further object of the invention to heat the sealed empty ampoule before the opening is made so that the temperature of the air within the ampoule is increased, thus causing the air to expand and flow outwardly as the opening is completed.

It is another object of the invention to provide a novel form of conveying mechanism to transport the ampoules through the heating and opening stages.

Other objects will be apparent from the following description of the invention taken in connection with the accompanying drawings, in which:

Fig. 2 is a front elevation of the mechanism shown in Fig. 1;

Fig. 3 is an enlarged sectional view taken on line 3—3 of Fig. 1; and

Fig. 4 is an enlarged sectional view taken on line 4—4 of Fig. 1.

Figure 1:
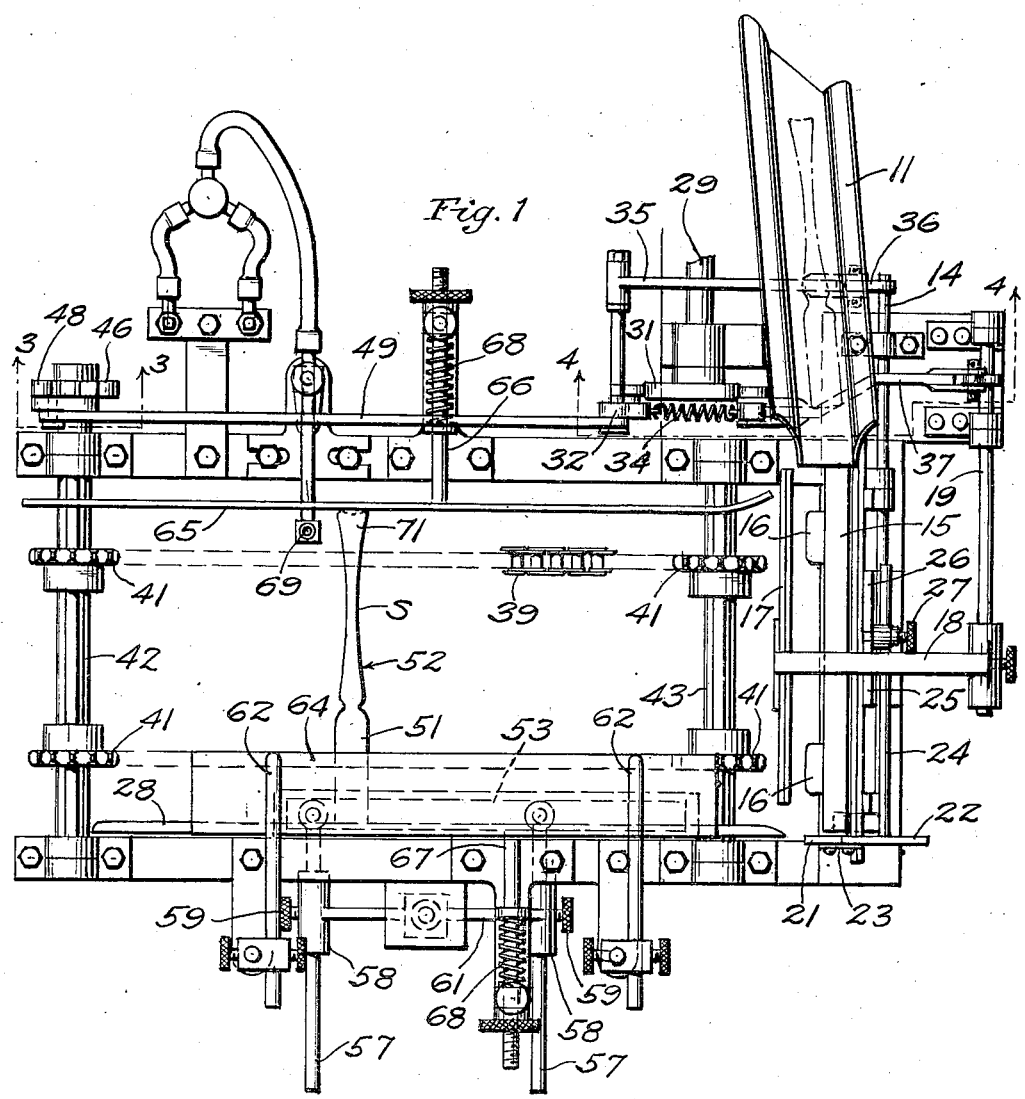
Fig. 1 is a top plan view of the apparatus, parts thereof being broken away for clarity.

Referring to the drawings, in which like reference numerals indicate the same parts, a frame 10 is attached by any suitable means to the base of an ampoule making machine of the type shown in the Dichter patent referred to hereinbefore. The frame may, however, be associated with any type of machine for making necked ampoules and need not form a part thereof or even be located at or near the machine.

Disposed to one side of the frame and attached thereto or to the machine is an inclined chute 11 which guides the shaped ampoules to the conveying mechanism, the latter being indicated generally at 12. At the bottom of the chute and aligned therewith and with the conveyor is a support 13 which is fixed on an oscillatable shaft 14. This support comprises a plate 15 having secured thereto a pair of spaced fingers 16, the plate being secured to shaft 14. The purpose of the spaced fingers will be explained hereinafter.

In Fig. 2, the support is shown in its lower position, but at the time the ampoule is deposited thereon it is raised to a position wherein it is much less inclined downwardly. When the support is in its upper position, a gate 17 prevents the ampoules from rolling from support 13 onto the conveyor until such time as the gate is lifted. As will be seen in Fig. 2, gate 17 is mounted on one depending arm of a substantially inverted U-shaped member 18 secured to shaft 19. A stop plate 21 is connected to arm 22 by means of a spring leaf 23 and serves to prevent the ampoules from sliding off support 13 when deposited thereon. Spring member 23 dampens the shock when the ampoule strikes the stop plate. Arm 22 is fixed to rod 24, the latter being slidable and adjustable with respect to bracket 25 secured to upright 26 mounted on frame 10. Set screw 27 holds rod 24 in its adjusted position, the position of the stop plate being thus adjustable to bring the base of the ampoule into alignment with guide 28 associated with the conveyor.

The means for oscillating gate 17 and support 13 will now be described. If the conveyor mechanism is associated with an ampoule making machine it is desirable that it be driven in timed relation thereto and, for this reason, the shaft 29 is preferably driven from the prime mover for the machine. This shaft has secured thereto a cam 31 clearly seen in Fig. 4. Pivoted to frame 10 at 30, 30' on opposite sides of the axis of shaft 29 are a pair of rocker arms 32, 33, each having a roller or follower 32', 33' adapted to cooperate with cam 31. The arms are drawn toward the cam and toward each other by spring 34. Arm 32 is connected by link 35 with arm 36 fast on shaft 14, while arm 33 is connected through link 37 to arm 38 which is keyed or otherwise secured to shaft 19.

Cam 31 is so designed that the arms 32, 33 are rocked alternately and in succession so that gate 17 is raised and lowered while support 13 remains in its upper position, after which the support is lowered and raised while gate 17 remains stationary. It will, therefore, be apparent that gate 17 is periodically lifted to permit an ampoule resting on support 13 (when the latter is in its elevated position) to roll onto the conveyor. If, however, any of the ampoules are broken and fail to roll onto the conveyor, the support and fingers thereon will deposit them below the conveyor when the support is lowered.

Conveyor 12 comprises an endless chain 39 cooperating with sprockets 41 on shafts 42, 43, and each link of the chain has attached thereto a notched plate 44 having integral therewith a finger 45. The chain is driven intermittently and, as will be seen in Fig. 2, these fingers are positioned to guide the ampoules into the notches in the plate as gate 17 is lifted. The means for driving the conveyor comprises a ratchet disc 46 fixed on shaft 42, pawl 47 pivoted on arm 48, the latter being oscillatably mounted on shaft 42, and link 49 connecting arm 48 with rocker arm 32. Hence, each time support 13 is lowered, the arm 48 is rocked and the conveyor is moved a distance equal to that between two adjacent links.

Disposed on that side of the conveyor which supports the enlarged or main portion 51 of ampoule 52 is an elongated burner 53 supported by vertical rods 54 adjustably positioned in brackets 55 by set screws 56. Brackets 55 are connected to or formed integral with horizontal rods 57 which, in turn, are adjustably secured in brackets 58 by set screws 59. Brackets 58 form portions of a cross arm 61 fixed to the frame. Thus burner 53 is adjustable vertically as well as horizontally to permit its use with ampoules of several lengths and diameters.

Disposed above the burner and adjustably secured to the frame by means of rods 62, 63, is a plate 64 having on its under side an asbestos lining. Although the plate is shown as being relatively narrow, it may be made sufficiently wide to extend across the conveyor to guide rail 65. Rails 65 and 28 are secured to the frame by means of rods 66, 67, each of which is adjustable in its respective bracket, and, by the interposition of springs 68 between the brackets and the frame, the guide rails are more or less yieldable to compensate for variations in the dimensions of the ampoules.

Adjustably positioned on that side of the frame opposite burner 53 is a sharp flame burner 69. The position of this latter burner is such that it will underlie the reduced neck portion 71 of an ampoule at a time when the conveyor is momentarily at rest. The flame from this burner is sufficiently intense and sharp so that, while the ampoule is positioned thereover, the flame will puncture or open a hole near the closed end of the neck portion. It will be noted that flame 69 is not directed against the neck of the ampoule until after the main portion of the ampoule has been subjected to the heat from burner 53 for a considerable period. Hence, when the sharp flame opens the neck of the ampoule, the temperature of the air therein has been raised to point where the internal pressure is greater than that of the surrounding exterior air, i. e., above atmospheric pressure. When the neck is opened, therefore, the air within the ampoule flows outwardly, thus obviating any danger of any foreign material finding its way into the ampoule.

From the foregiong description the operation of the machine and the method of relieving the subnormal pressure in the ampoule will be apparent. During the shaping operations, the bottom of the ampoule is closed by a bottoming device and the neck is closed when severed from the tube by a flame cutter. When the shaping of an ampoule in the machine is completed, the ampoule drops into chute 11 and onto support 13. Gate 17 releases the ampoule to permit its deposition on the conveyor which carries it by a step-by-step movement over burner 53 and then positions the neck of the ampoule over the sharp flame for a period sufficiently long to permit an opening to be made near the closed end of the neck. Although the air in the ampoule is rarefied when the ampoule is first deposited on the conveyor, the heating thereof causes it to expand when the neck is opened and the direction of its flow is outwardly of the ampoule. Continued movement of the conveyor deposits the ampoules in a suitable receptacle where, upon cooling, the pressure of the air within the ampoule is equal to that surrounding it.

Before filling and sealing the ampoules, they are cut or scored and broken off at the smallest constricted portions of their necks, as indicated at S. Obviously, if there were a partial vacuum in the ampoule, there would be danger of minute particles of glass or other foreign matter being drawn into the ampoule when fractured, and the consequent possibility of these particles being injected into the blood stream with serums or antitoxins. However, by relieving this vacuum, these dangers are obviated.

In the preferred form of the invention, the mechanism is so timed that the step-by-step movement of the conveyor coincides with similar step-by-step movements of the shaping machine. It is obvious, however, that the vacuum relieving device is not necessarily dependent on the operation of the shaping machine and it is, therefore, not intended that the invention be so limited. Neither is the invention to be limited to the exact details illustrated in the accompanying drawings, but is to be interpreted by the appended claim.

What is claimed is:

Apparatus for relieving sub-normal pressure in an empty sealed glass ampoule comprising a burner for heating a portion of the ampoule to increase the internal pressure therein to a pressure above atmospheric pressure, means for conveying the ampoule over said burner, a burner having a relatively small nozzle for directing a sharp flame against the wall of the container to puncture said ampoule while so heated, an ampoule support adjacent one end of said conveying means, a gate adapted when lifted to permit an ampoule to be transferred from said support to said conveying means, ratchet mechanism for driving said conveyor intermittently, a pair of reciprocating rods, one for actuating said ratchet mechanism, the other for elevating said gate, and cam means for alternately reciprocating said rods, said ampoule being positioned over said puncturing means while the conveyor is at rest.

HARRY RICHTER.